March 13, 1962   R. E. GRANTHAM   3,025,523
V.H.F. AIRCRAFT ANTENNA
Filed Jan. 17, 1957

*INVENTOR.*
R. E. GRANTHAM
BY

ATTYS.

United States Patent Office 3,025,523
Patented Mar. 13, 1962

3,025,523
V.H.F. AIRCRAFT ANTENNA
Rodney E. Grantham, Bethesda, Md., assignor to the United States of America as represented by the Secretary of the Navy
Filed Jan. 17, 1957, Ser. No. 634,800
1 Claim. (Cl. 343—705)
(Granted under Title 35, U.S. Code (1952), sec. 266)

The invention described herein may be manufactured and used by or for the Government of the United States of America for government purposes without the payment of any royalties thereon or therefor.

The present invention relates generally to an aircraft antenna and more particularly to a VHF aircraft antenna for producing an electromagnetic radiation field having spherical equiphase surfaces.

The general purpose of this invention is to provide an aircraft antenna which produces spherical equiphase surfaces at distances from the antenna proper of from one wavelength to an infinite number of wavelengths, and which excites no currents in the aircraft structure except in the wing-tip. In attaining these objectives, the present invention contemplates the provision of a linearly fed half-wave dipole mounted substantially one-quarter wavelength from the metallic tip of an aircraft wing with the dipole elements disposed substantially coplanar with the wing and parallel to the tangent at the juncture of the antenna with the wing-tip, the dipole elements being energized by equal and opposite voltages to thereby linearly polarize the antenna in a direction substantially parallel to the aircraft fuselage. This assembly, when considered as a transmitting antenna, radiates an electromagnetic field which, at any point in space, is the vector resultant of radiation from the dipole and of radiation from the metallic wing-tip functioning as a reflector of energy originally radiated from the dipole.

While the antenna of the present invention is of general utility on aircraft for purposes of communication, radar or telemetering, it finds special application in the field of evaluating the aeroballistic characteristics of ordnance missiles, where it is often the practice to fire missiles toward a drone having data-evaluating electronic equipment operatively associated therewith. In such tests, it has been found that the utilization of a spherical equiphase electromagnetic field facilitates the correlation of data obtained.

With the foregoing in mind, it is an important object of the invention to provide an aircraft antenna which produces an electromagnetic radiation field having spherical equiphase surfaces.

Another object is to employ a metallic wing-tip of an aircraft as a reflector of energy for a dipole radiator mounted thereon.

A further object is to provide an aircraft antenna which produces a substantially circular radiation pattern in the plane of the aircraft wing and a substantially cardioid radiation pattern in a plane perpendicular to the aircraft wing.

A still further object of the invention is the provision, on an aircraft wing, of an antenna which is linearly polarized in a direction parallel to the aircraft fuselage.

Still another object resides in the combination of radiation from a linear-driven antenna and the reflection from an aircraft metal wing-tip upon which the antenna is mounted to produce a nearly omnidirectional pattern and an electromagnetic field of spherical equiphase surfaces.

A significant object is to provide a center-fed half-wave dipole securely positioned substantially one-quarter wavelength from a metal-covered wing-tip of an aircraft and disposed parallel to the tangent at the junction of the dipole with the wing-tip.

Another significant object is to energize a half-wave dipole antenna mounted nominally one-quarter wavelength from a metal-covered wing-tip, with equal currents on opposite sides of the mid-point of the antenna.

A primary object of the present invention is the provision of a center-fed, linear half-wave dipole antenna mounted on the metal-covered tip of an aircraft wing with the dipole elements of the antenna being disposed coplanar with the wing and parallel to a line which is tangent to the wing-tip, the point of tangency being on the perpendicular bisector of the antenna and centered between ends of the wing-tip, the dipole elements being spaced substantially a quarter-wavelength from the line of tangency.

Other objects and features of the invention will become apparent to those skilled in the art as the same becomes better understood from the following detailed description when considered in connection with the accompanying sheet of drawings wherein.

Figure 1:
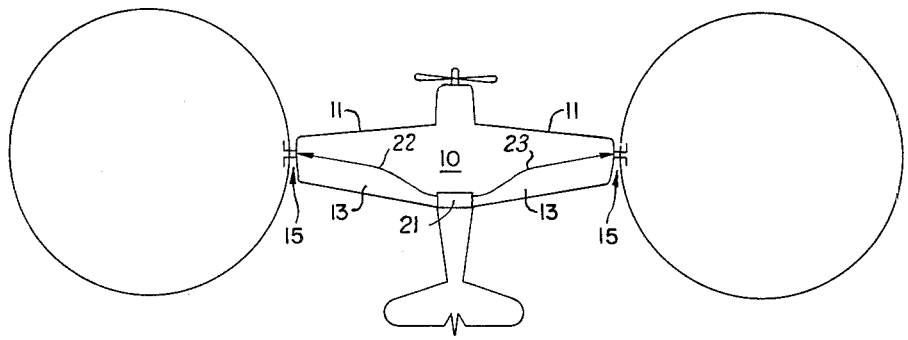
FIG. 1 is a plan view of an aircraft incorporating the antenna of the present invention on both wings and illustrating the circular radiation pattern obtained therefrom in the plane of the aircraft wing.
Figure 2:
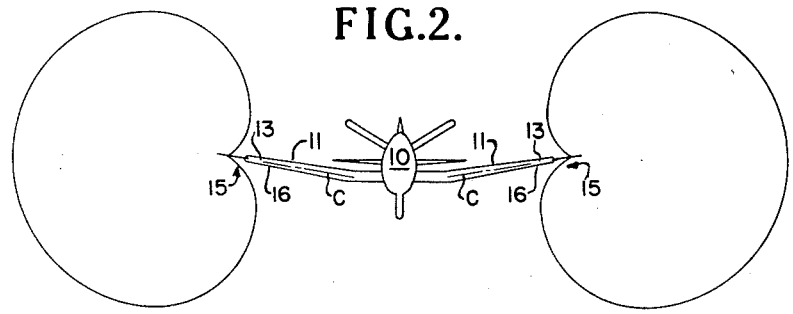
FIG. 2 is a vertical view of the aircraft and illustrates the cardioid radiation pattern produced by the antenna in a plane substantially perpendicular to the aircraft wing.

Referring now to the drawings, wherein like reference characters designate like or corresponding parts throughout the several views, there is shown in FIG. 1 an aircraft 10 having an antenna, indicated generally as 15, mounted on the outer extremity of each wing 11. A transmitter 21 is connected to each of the antennas 15 and supplies them with very high frequency signals by any suitable means as indicated by arrows 22, 23 respectively. As will become more apparent hereinafter, the radiation pattern from each antenna in the plane of the aircraft wing is of circular configuration. FIG. 2 serves to illustrate, among other features, the cardioid radiation pattern, of each antenna 15, in a plane substantially perpendicular to the aircraft wing 11. Although an antenna is mounted on each wing, it is to be understood that this is by way of illustration only since each antenna 15 is a complete unit in itself and that only a single wing may have an antenna mounted thereon if so desired.

Figure 3:
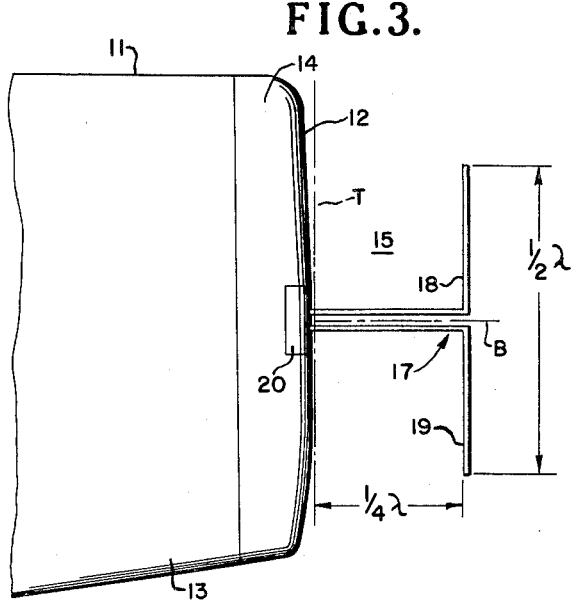
FIG. 3 is an exploded fragmentary view of the aircraft wing-tip showing details of the dipole mounted thereon.

Referring now to FIG. 3, wherein is shown a fragment of a wing 11 illustrating the specific details of the antenna of the present invention, the antenna 15 consists of a nominally half-wave dipole radiator, indicated generally as 17, and a reflector defined by the outer extreme edge or tip 12 of wing 11. As is more clearly shown in FIG. 2, the cross-sectional profile of tip 12 is of convex configuration. The complete wing 11 may be metal-covered or may be fabricated of any material suitable for the purpose with the tip thereof covered by a metal reflector 14 shaped to conform to the contour of the wing-tip, as illustrated in FIG. 3. In order to serve as a reflector, the metal reflector 14 must be constructed from sheet material of sufficient thickness to be a good conductor at the operating frequency of the half-wave dipole 17. The remainder of the aircraft may or may not be metal covered, since currents are not excited in appreciable magnitude in any part of the aircraft other than the wing-tip.

The dipole radiator 17 is of the balanced, center-fed type and is a half-wave length long at the operating frequency thereof, as indicated. The dipole elements 18 and 19 are mounted substantially in a plane which contains the aircraft wing 11, better illustrated in FIG. 2, and are parallel to a line T which is tangent to the wing-tip 12. However, since wing-tips must of necessity be of finite thickness, it is to be understood that radiator 17 is mounted on the convex surface of tip 12 at a point approximately intermediate surfaces 13 and 16 (FIG. 2) of wing 11 and for all practical purposes is substantially coplanar with wing 11, as shown by dashed line C in FIG. 2. Also, since wing-tip contours are usually not a straight line, the point of tangency is on the perpendicular bisector B of radiator 17 and, for optimum results, should be approximately centered between the ends of the wing-tip 12, although not restricted thereto. The spacing between dipole elements 18, 19 and the wing-tip tangent line T is nominally one-quarter wavelength of the operating frequency, as shown.

The radiator 17 is supported from the wing by a metallic mounting assembly 20 which is securely affixed, by any suitable means such as screws or welding, within a recess in tip 12 and substantially conforms to the contour thereof. The assembly 20 is perpendicularly and rigidly secured to radiator 17 and must be connected thereto at its mid-point or at locations symmetrically spaced about the mid-point. The feed connection, housed within assembly 20 and not shown, may be any of several types which excite equal currents on opposite sides of the mid-point of radiator 17.

In the operation of the aforedescribed arrangement, the electromagnetic waves radiated directly by radiator 17 are complemented by the waves reflected from reflector 14 to produce the circular and cardioid radiation patterns shown in FIG. 1 and 2 respectively. As a consequence of these patterns, the electromagnetic field developed therefrom is characterized by spherical equiphase surfaces which at any point in space is the vector resultant of direct radiation from radiator 17 and reflected radiation from reflector 14.

From the foregoing, it is apparent that the invention provides a unique aircraft antenna arrangement of rigid construction for producing spherical equiphase electromagnetic surfaces.

Obviously many modifications and variations of the present invention are possible in the light of the above teachings. It is therefore to be understood that, within the scope of the teachings herein and the appended claim, the invention may be practiced otherwise than as specifically described.

What is claimed and desired to be secured by Letters Patent of the United States is:

In an omni-directional airborne transmitting system, a pair of antennas mounted on the tip portions of two opposite wings of an aircraft, each of said tip portions being metallic and of convex shape whereby said portions are electromagnetic reflectors, each of said antennas comprising a half-wave dipole radiator having a mid-point; each radiator comprising means secured to one of said tip portions for maintaining the dipole elements of said radiator coplanar with its supporting wing and a quarter wave length from the tip thereof and parallel to a line tangent to the tip of the last named wing, the point of tangency being on the perpendicular bisector of the radiator and centered between the ends of said one tip portion; and a transmitter connected to said elements to apply equal and oppositely phased currents to opposite sides of the mid-point of each radiator, thereby producing omni-directional, equi-phase surface signals into space.

References Cited in the file of this patent
UNITED STATES PATENTS

| | | |
|---|---|---|
| 2,403,500 | Carlson | July 9, 1946 |
| 2,414,266 | Lindenblad | Jan. 14, 1947 |
| 2,562,296 | Christensen | July 31, 1951 |
| 2,831,187 | Harris et al. | Apr. 15, 1958 |